(12) United States Patent
Lu et al.

(10) Patent No.: US 11,030,175 B2
(45) Date of Patent: *Jun. 8, 2021

(54) BLOCKCHAIN BASED HIERARCHICAL DATA STORAGE

(71) Applicant: Advanced New Technologies Co., Ltd., Grand Cayman (KY)

(72) Inventors: Zhonghao Lu, Hangzhou (CN); Haizhen Zhuo, Hangzhou (CN); Benquan Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,571

(22) Filed: Nov. 6, 2020

(65) Prior Publication Data
US 2021/0056088 A1 Feb. 25, 2021

Related U.S. Application Data

(63) Continuation of application No. 16/790,599, filed on Feb. 13, 2020, now Pat. No. 10,853,341, which is a (Continued)

(30) Foreign Application Priority Data

Jun. 28, 2019 (CN) .......................... 201910576964.3

(51) Int. Cl.
*G06F 16/22* (2019.01)
*G06F 16/27* (2019.01)
*G06F 16/21* (2019.01)

(52) U.S. Cl.
CPC ........ *G06F 16/2246* (2019.01); *G06F 16/214* (2019.01); *G06F 16/27* (2019.01)

(58) Field of Classification Search
CPC ..... G06F 16/2246; G06F 16/214; G06F 16/27
(Continued)

(56) References Cited

U.S. PATENT DOCUMENTS

| | | | |
|---|---|---|---|
| 10,355,869 B2 * | 7/2019 | Bisti | ..................... H04L 9/3247 |
| 10,615,985 B2 * | 4/2020 | Lin | ..................... H03M 13/154 |

(Continued)

FOREIGN PATENT DOCUMENTS

| | | |
|---|---|---|
| CN | 106407303 | 2/2017 |
| CN | 106503992 | 3/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Phong H Nguyen
(74) *Attorney, Agent, or Firm* — Fish & Richardson P.C.

(57) ABSTRACT

Disclosed herein are methods, systems, and apparatus, including computer programs encoded on computer storage media, for blockchain-based hierarchical data storage. One of the methods includes determining, based on a blockchain stored in a database that includes multiple levels of storage, a level of storage of the multiple levels of storage that meets a data migration condition as a target level of storage, wherein state data of the blockchain are stored as state Merkle trees in data worksheets of the multiple levels of storage, generating, for the target level of storage, an empty data worksheet in response to determining that the target level of storage meets the data migration condition, and storing at least a portion of a state Merkle tree corresponding to a newly created block of the blockchain to the empty data worksheet.

20 Claims, 7 Drawing Sheets

Related U.S. Application Data continuation of application No. PCT/CN2020/072010, filed on Jan. 14, 2020.

(58) Field of Classification Search
USPC .................................................. 707/797, 812
See application file for complete search history.

(56) References Cited

U.S. PATENT DOCUMENTS

| | | | | |
|---|---|---|---|---|
| 10,616,324 | B1* | 4/2020 | Kaddoura | H04L 43/04 |
| 10,853,341 | B2 | 12/2020 | Lu | |
| 2018/0063709 | A1* | 3/2018 | Morrison | H04L 9/3236 |
| 2018/0198624 | A1* | 7/2018 | Bisti | H04L 9/0891 |
| 2018/0253702 | A1* | 9/2018 | Dowding | G06Q 20/06 |
| 2018/0285996 | A1* | 10/2018 | Ma | G06F 16/2428 |
| 2019/0146946 | A1* | 5/2019 | Zhang | G06F 16/1744 707/667 |
| 2019/0146979 | A1 | 5/2019 | Madisetti | |
| 2019/0147438 | A1 | 5/2019 | Micali et al. | |
| 2019/0207748 | A1* | 7/2019 | Courtney | H04L 9/0637 |
| 2019/0236298 | A1* | 8/2019 | Agarwal | H04L 9/3239 |
| 2019/0243572 | A1* | 8/2019 | Kursun | G06F 3/0632 |
| 2020/0019545 | A1* | 1/2020 | Ye | G06F 3/0638 |
| 2020/0117367 | A1* | 4/2020 | Zhou | G06F 3/0671 |
| 2020/0142992 | A1* | 5/2020 | Ocher | G06F 16/24556 |

FOREIGN PATENT DOCUMENTS

| | | |
|---|---|---|
| CN | 108197226 | 6/2018 |
| CN | 108427601 | 8/2018 |
| CN | 108595720 | 9/2018 |
| CN | 109144414 | 1/2019 |
| CN | 109313752 | 2/2019 |
| CN | 109408551 | 3/2019 |
| CN | 110347684 | 10/2019 |
| TW | 1578168 | 4/2017 |
| TW | 201905813 | 2/2019 |
| WO | WO 2018037148 | 3/2018 |

OTHER PUBLICATIONS

Decker et al., "Information Propagation in the Bitcoin Network", 13th IEEE International Conference on Peer-to-Peer Computing, Dec. 2013, 10 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/072010, dated Apr. 13, 2020, 17 pages (with machine translation).

Su et al., "Research on the Campus Fire Management Model Based on Private Blockchain", College of Computer Science and Engineering, Hangzhou Dianzi University, Apr. 2018, 6 pages (with English abstract).

* cited by examiner

BLOCKCHAIN BASED HIERARCHICAL DATA STORAGE

CROSS-REFERENCE TO RELATED APPLICATIONS

This application is a continuation of U.S. application Ser. No. 16/790,599, filed Feb. 13, 2020, which is a continuation of PCT Application No. PCT/CN2020/072010, filed on Jan. 14, 2020, which claims priority to Chinese Patent Application No. 201910576964.3, filed on Jun. 28, 2019, and each application is hereby incorporated by reference in its entirety.

TECHNICAL FIELD

One or more embodiments of the present specification relate to the technical field of blockchain, and more particularly, to a hierarchical storage method and a hierarchical storage apparatus based on a blockchain, and an electronic device.

BACKGROUND

Blockchain technology, also known as distributed ledger technology, is an emerging technology in which several computing devices participate in "book-keeping" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present specification provides a hierarchical storage method based on a blockchain, wherein account state data of the blockchain is organized into a state Merkle tree and stored in a database; the database includes multi-level data storage; and the method includes the following: when target data storage of any level in the database satisfies a data migration condition, creating an empty data table corresponding to a working data table for the target data storage; storing the state Merkle tree of a newly added block written into the target data storage in the empty data table, and migrating the state Merkle tree of a block corresponding to a target block number stored in the working data table into the empty data table, where the target block number is the largest block number among the block numbers corresponding to the state Merkle trees stored in the target data storage; and after the state Merkle tree of the block corresponding to the target block number stored in the working data table has been migrated to the empty data table, further migrating the state Merkle trees stored in the working data table to the lower level data storage of the target data storage.

Optionally, the method further includes: after the state Merkle tree of the block corresponding to the target block number stored in the working data table has been migrated to the empty data table, switching the working data table to a historical data table, and switching the empty data table to a working data table.

Optionally, further migrating the state Merkle trees stored in the working data table to the lower level data storage of the target data storage includes: after the working data table is switched to a historical data table, further migrating the state Merkle trees stored in the historical data table to a lower level data storage of the target data storage; and after the state Merkle trees stored in the historical data table has been successfully migrated to the lower level data storage of the target data storage, deleting the historical data table.

Optionally, storing the state Merkle tree of a newly added block written into the target data storage in the empty data table includes: storing the state Merkle tree of the newly added block written into the target data storage only to the empty data table; or storing the state Merkle tree of the newly added block written into the target data storage into both of the empty data table and the working data table.

Optionally, the method further includes: upon receiving a searching request for a data node on a state Merkle tree of the target data storage while the target data storage has double working tables, if the state Merkle tree of the newly added block written to the target data storage is only stored to the empty data table, in response to the searching request, searching for the node from both of the empty data table and the working data table; and if the state Merkle tree of the newly added block written to the target data storage is stored to both of the empty data table and the working data table, in response to the searching request, searching for the node only from the working data table.

Optionally, the state Merkle tree of the newly added block includes: the state Merkle tree of the latest block generated by the blockchain; or the state Merkle tree of the historical block which is migrated from the upper-level data storage to the target data storage.

Optionally, the database is a Key-Value database; and the data nodes on the state Merkle tree are stored in the database in the form of Key-Value pairs; wherein the key of the Key-Value pair is a hash value of the data content contained in the data node; the value of the Key-Value pair is the data content contained in the data node.

Optionally, the Merkle tree is a variant of a Merkle tree incorporating a Trie dictionary tree structure.

Optionally, the state Merkle tree is a Merkle Patricia Tree state tree.

Optionally, the database is a LevelDB database; or a database based on the LevelDB architecture.

Optionally, the database is a Rocksdb database based on a LevelDB architecture.

Optionally, the read-write performance of the storage medium corresponding to the multi-level data storage has a difference in performance; and the read-write performance of the storage medium corresponding to the high-level data storage is higher than the read-write performance of the storage medium corresponding the low-level data storage.

The present specification also provides a hierarchical storage apparatus based on a blockchain, wherein account state data of the blockchain is organized into a state Merkle tree and stored in a database; the database includes multi-level data storage; and the apparatus includes: a creating module, configured to: when target data storage of any level in the database satisfies a data migration condition, create an empty data table corresponding to a working data table for the target data storage; a migration module, configured to store the state Merkle tree of a newly added block written into the target data storage in the empty data table, and migrate the state Merkle tree of a block corresponding to a target block number stored in the working data table into the empty data table, where the target block number is the largest block number among the block numbers corresponding to the state Merkle trees stored in the target data storage; and after the state Merkle tree of the block corresponding to the target block number stored in the working data table has been migrated to the empty data table, further migrate the state Merkle trees stored in the working data table to the lower level data storage of the target data storage.

Optionally, the migration module is configured to after the state Merkle tree of the block corresponding to the target block number stored in the working data table has been migrated to the empty data table, switch the working data table to a historical data table, and switch the empty data table to a working data table.

Optionally, the migration module is further configured to after the working data table is switched to a historical data table, further migrate the state Merkle trees stored in the historical data table to a lower level data storage of the target data storage; and after the state Merkle trees stored in the historical data table has been successfully migrated to the lower level data storage of the target data storage, delete the historical data table.

Optionally, the migration module is configured to store the state Merkle tree of the newly added block written into the target data storage only to the empty data table; or store the state Merkle tree of the newly added block written into the target data storage into both of the empty data table and the working data table.

Optionally, the apparatus further includes: a searching module, configured to: upon receiving a searching request for a data node on a state Merkle tree of the target data storage while the target data storage has double working tables, if the state Merkle tree of the newly added block written to the target data storage is only stored to the empty data table, in response to the searching request, search for the node from both of the empty data table and the working data table; and if the state Merkle tree of the newly added block written to the target data storage is stored to both of the empty data table and the working data table, in response to the searching request, search for the node only from the working data table.

Optionally, the state Merkle tree of the newly added block includes: the state Merkle tree of the latest block generated by the blockchain; or the state Merkle tree of the historical block which is migrated from the upper-level data storage to the target data storage.

Optionally, the database is a Key-Value database; and the data nodes on the state Merkle tree are stored in the database in the form of Key-Value pairs; wherein the key of the Key-Value pair is a hash value of the data content contained in the data node; the value of the Key-Value pair is the data content contained in the data node.

Optionally, the Merkle tree is a variant of a Merkle tree incorporating a Trie dictionary tree structure.

Optionally, the state Merkle tree is a Merkle Patricia Tree state tree.

Optionally, the database is a LevelDB database; or a database based on the LevelDB architecture.

Optionally, the database is a Rocksdb database based on a LevelDB architecture.

Optionally, the read-write performance of the storage medium corresponding to the multi-level data storage has a difference in performance; and the read-write performance of the storage medium corresponding to the high-level data storage is higher than the read-write performance of the storage medium corresponding the low-level data storage.

In the above technical solutions, since the largest block number among the block numbers corresponding to the state Merkle trees stored in the working data table of the target data storage usually indicates the block number of the latest block stored in the working data table, the state Merkle tree of a newly added block written into the target data storage can be stored in the empty data table which is created for the target data storage and corresponding to the working data table, and the state Merkle tree corresponding to the largest block number stored in the working data table is also migrated into the empty data table. It can achieve storing the state Merkle tree of the latest block stored in the target data storage to the empty data table, and retaining the state Merkle trees of historical blocks in the working data table. In this way, after the state Merkle tree corresponding to the largest block number stored in the working data table has been migrated into the empty data table, by further migrating the state Merkle trees stored in the working data table to the lower level data storage of the target data storage, it can achieve hierarchical storage of the state Merkle trees of the target data storage, that is, keeping storing and retaining the state Merkle tree of the latest block in the current-level storage, and migrating the state Merkle trees of historical blocks to the lower level data storage.

DESCRIPTION OF EMBODIMENTS

Figure 1:
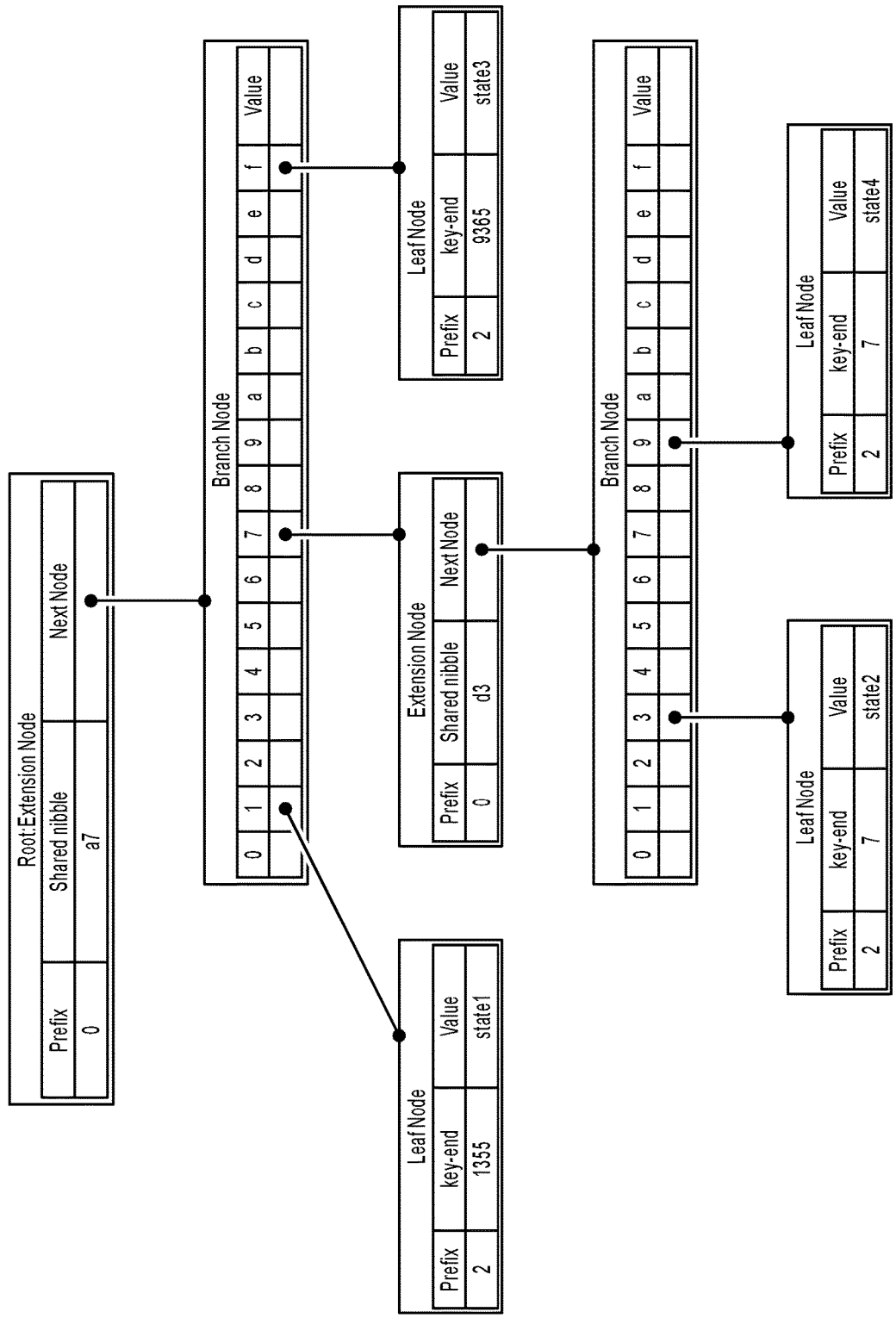
FIG. 1 is a schematic diagram of organizing account state data of a blockchain into an MPT state tree, according to an example embodiment.

Example embodiments will be described in detail here, examples of which are illustrated in the accompanying drawings. When the following description refers to the accompanying drawings, the same numerals in different drawings represent the same or similar elements unless otherwise indicated. The implementations described in the following example embodiments do not represent all implementations consistent with one or more embodiments of the present specification. Rather, they are merely examples of apparatuses and methods consistent with some aspects of one or more embodiments of the present specification, as detailed in the appended claims.

It should be noted that, in other embodiments, the steps of the corresponding method are not necessarily performed in the order shown and described in the present specification. In some other embodiments, the method may include more or fewer steps than described in the present specification. In addition, a single step described in the present specification may be divided into multiple steps for description in other embodiments; and multiple steps described in the present specification may be combined into a single step for other embodiments.

Blockchains are generally divided into three types: public blockchains, private blockchains, and consortium blockchains. In addition, there can be combinations of the above types, such as private blockchain+consortium blockchain, consortium blockchain+public blockchain, etc. Here, the most decentralized is the public blockchain. The public blockchain is represented by Bitcoin and Ethereum. Participants joining the public blockchain can read data records on the chain, participate in transactions, and compete for the book-keeping right for latest blocks.

Moreover, each participant (i.e. each node) can freely join and leave the network and perform related operations. On the contrary, for the private blockchain, the write permission of the network is controlled by an organization or institution, and the data read permission is regulated by the organization. In simple terms, a private blockchain can be a weakly centralized system with strict restrictions on participating nodes and having a small number of nodes. This type of blockchain is more suitable for internal use by specific institutions.

Based on the basic characteristics of a blockchain, a blockchain is usually composed of several blocks. In each of these blocks, a timestamp corresponding to the creation time of the block is recorded, and all of the blocks form a time-ordered data chain strictly based on the timestamps recorded in the blocks.

The real data generated by the physical world can be constructed into a standard transaction format supported by the blockchain, and then posted to the blockchain, and the node devices in the blockchain will perform consensus processing on it. After reaching a consensus, the transaction will be packaged into a block by the node device that acts as a book-keeping node in the blockchain, and are stored persistently as a credential in the blockchain.

In the field of blockchain, there is an important concept: account. Taking Ethereum as an example, accounts are divided into two types: external accounts and contract accounts. An external account is an account directly controlled by a user; and a contract account is an account containing contract codes (that is, smart contracts) which is created by a user through an external account.

For some blockchain projects (such as the ant blockchain) derived from the Ethereum-based architecture, the account types supported by the blockchain can be further expanded, which is not specifically limited in this description.

For an account in the blockchain, a structure is usually used to maintain the account state of the account. When a transaction in a block is executed, the state of the account associated with the transaction in the blockchain usually also changes.

Taking Ethereum as an example, the structure of an account usually includes fields such as Balance, Nonce, Code, and Storage.

The Balance field is configured to maintain the current account balance of the account.

The Nonce field is configured to maintain the number of transactions for this account; and it is a counter used to ensure that each transaction can be processed only once, effectively avoiding replay attacks.

The Code field is configured to maintain the contract codes of the account. In actual application, the Code field usually only maintains the hash value of the contract codes; therefore, the Code field is also commonly called the Codehash field. For external accounts, this field is null.

The Storage field is configured to maintain the storage content of the account (the field value is null by default). In practice, the Storage field usually only maintains the root node of a Merkle Patricia Trie (MPT) that is constructed based on storage content of the account; therefore, the Storage field is also commonly called the StorageRoot field.

For an external account, the field values of the Code field and the Storage field are both nulls.

For most blockchain projects, Merkle trees are usually used; or, data structures based on Merkle trees are used to store and maintain data. Take Ethereum as an example.

Ethereum uses the MPT tree (a variant of Merkle tree) as a data organization form to organize and manage important data such as account states and transaction information.

For data that needs to be stored and maintained in the blockchain, Ethereum designed three MPT trees, which are MPT state tree, MPT transaction tree, and MPT receipt tree.

The MPT state tree is an MPT tree formed by the account state data of all accounts in the blockchain. The MPT transaction tree is an MPT tree formed by transaction data in the block. The MPT receipt tree is an MPT tree formed by transaction receipts respectively corresponding to the transactions in the block generated after the execution of the transaction in the block is completed. The hash values of the root nodes of the MPT state tree, the MPT transaction tree, and the MPT receipt tree will eventually be added to the block header.

Here, the MPT transaction tree and the MPT receipt tree correspond to a block, that is, each block has its own MPT transaction tree and MPT receipt tree. The MPT state tree is a global MPT tree, which does not correspond to a specific block, but covers the account state data of all accounts in the blockchain.

The organized MPT transaction tree, MPT receipt tree, and MPT state tree are eventually stored in a Key-Value database (such as LevelDB) that adopting a multi-level data storage structure.

The database adopting a multi-level storage structure can be divided into n-level data storages. For example, the data storage at each level can be set to L0, L1, L2, L3, ... L (n−1) in that order; for each level of data storage in the database, the smaller the level number is, the higher the level is. For example, L0 stores the latest data of several blocks, and L1 stores the second latest data of several blocks, and so on.

Here, the read-write performance of the storage medium corresponding to the data storage at each level may also have performance differences. The read-write performance of the storage medium corresponding to a high-level (that is, with a small level number) data storage may be higher than the read-write performance of the storage medium corresponding to a low-level (that is, with a large level number) data storage.

For example, in actual application, high-level data storage can use storage medium with higher writing and reading performance; while lower-level data storage can use storage medium with lower unit cost and larger capacity.

In actual application, as the block height of the blockchain increases, the data stored in the database will contain a lot of historical data. Moreover, the smaller the block number is, the older the data in the block is and the less important the data is. Therefore, in order to reduce the overall storage cost, data of different block heights usually need to be "treated differently".

For example, data in blocks with smaller block numbers can be stored on lower-cost storage media; data in blocks with larger block numbers can be stored on higher-cost storage media.

When data such as the MPT transaction tree, the MPT receipt tree, and the MPT state tree stored in the database is hierarchically stored, the MPT transaction tree and the MPT receipt tree correspond to each block, which is actually "unrelated between blocks" data; therefore, for the MPT transaction tree and the MPT receipt tree, it is easy to perform hierarchical storage; for example, the data can be migrated directly based on the block number of the node on the MPT transaction tree and the MPT receipt tree to complete the hierarchical storage.

Based on this, the present specification will not specifically explain the hierarchical storage of the MPT transaction tree and the MPT receipt tree, but focus on the hierarchical storage of the MPT state tree.

Referring to FIG. 1, which is a schematic diagram of organizing account state data of a blockchain into an MPT state tree.

An MPT tree is an improved Merkle tree variant, which combines advantages of Merkle tree and Trie dictionary tree (also called prefix tree).

There are usually three types of data nodes in the MPT tree, which are respectively leaf nodes, extension nodes and branch nodes.

A leaf node is a key-value pair expressed as [key, value], where the key is a special hexadecimal code.

An extension node is also a key-value pair [key, value], but the value is a hash value (hash index) of other nodes. In other words, other node can be linked through the hash index link.

For a branch node, since the key in the MPT tree is encoded into a special hexadecimal representation, plus a final value, the branch node is a list of a length of 17, in which the first 16 elements correspond to the 16 possible hexadecimal characters of the key (one character corresponds to one nibble). If there is a [key, value] pair terminated at this branch node, the last element represents the value of value, that is, the branch node can be either a termination of a search path or an intermediate node of a path.

Assuming that the account state data that needs to be organized into an MTP state tree is shown in Table 1 below:

TABLE 1

| Account Address (Key) | | | | | | | Account State (Value) |
|---|---|---|---|---|---|---|---|
| a | 7 | 1 | 1 | 3 | 5 | 5 | state1 |
| a | 7 | 7 | d | 3 | 3 | 7 | state2 |
| a | 7 | f | 9 | 3 | 6 | 5 | state3 |
| a | 7 | 7 | d | 3 | 9 | 7 | state4 |

In Table 1, the account address is a string of hexadecimal characters. The account state is a structure composed of the fields such as Balance, Nonce, Code, and Storage.

The final MPT state tree organized based on the account state data in Table 1 is shown in FIG. 1. As shown in FIG. 1, the MPT state tree formed by the account state data in Table 1 is composed of 4 leaf nodes, 2 branch nodes, and 2 extension nodes.

In FIG. 1, the prefix field is a prefix field shared by the extension node and the leaf node. In actual application, field values of the prefix field can be used to represent the type of the node.

The value of the prefix field being 0 indicates an extension node containing an even number of nibbles. As mentioned earlier, a nibble represents half of a byte, consisting of 4-bit binary, and a nibble can correspond to a character that constitutes an account address.

The value of the prefix field being 1 indicates an extension node containing an odd number of nibble(s).

The value of the prefix field being 2 indicates a leaf node containing an even number of nibbles.

The value of the prefix field being 3 indicates a leaf node containing an odd number of nibble(s).

For a branch node, since it is a prefix node of single nibbles in parallel, the branch node does not have the prefix field described above.

A Shared nibble field in an extension node corresponds to the key value of the key-value pair contained in the extension node, which represents a common character prefix between account addresses. For example, all account addresses in the table above have a common character prefix a7. The Next Node field is filled with a hash value (a hash index) of the next node.

The hexadecimal character 0~f field in the branch node corresponds to the key value of the key-value pair contained in the branch node. If the branch node is an intermediate node on the search path of the account address on the MPT tree, the Value field of the branch node can be null. The 0~f field is used to fill the hash value of the next node.

The key-end in the leaf node corresponds to the key value of the key-value pair contained in the leaf node, and represents the last a few characters of the account address. The key value of each node on the search path from the root node to the leaf node constitutes a complete account address. The Value field of the leaf node is filled with account state data corresponding to the account address. For example, the structure formed by the above fields such as Balance, Nonce, Code, and storage can be encoded and then filled into the Value field of the leaf node.

Further, the nodes on the MPT state tree shown in FIG. 1 are finally stored in the database in the form of key-value pairs Key-Value.

Here, when a node on the MPT state tree is stored in the database, the key in the key-value pair of the node on the MPT state tree can be the hash value of the data content contained in the node; and the Value in the key-value pair of the node on the MPT state tree is the data content contained in node.

That is, when a node on the MPT state tree is stored in the database, a hash value of the data content contained in the node can be calculated (that is, a hash value is calculated with respect to the entire node), and the calculated hash value can be used as a key. The data content contained in the node is used as value to generate a key-value pair Key-Value; then, the generated key-value pair Key-Value is stored in the database.

Since the node on the MPT state tree is based on the hash value of the data content contained in the node as the Key, and the data content contained in the node which is stored as the value, when a node on the MPT state tree is searched for, the hash value of the data content contained in the node can generally be used as a key for content addressing. When content addressing is applied, nodes with "duplicate content" can usually be "reused" to save storage space for storing data.

Figure 2A:
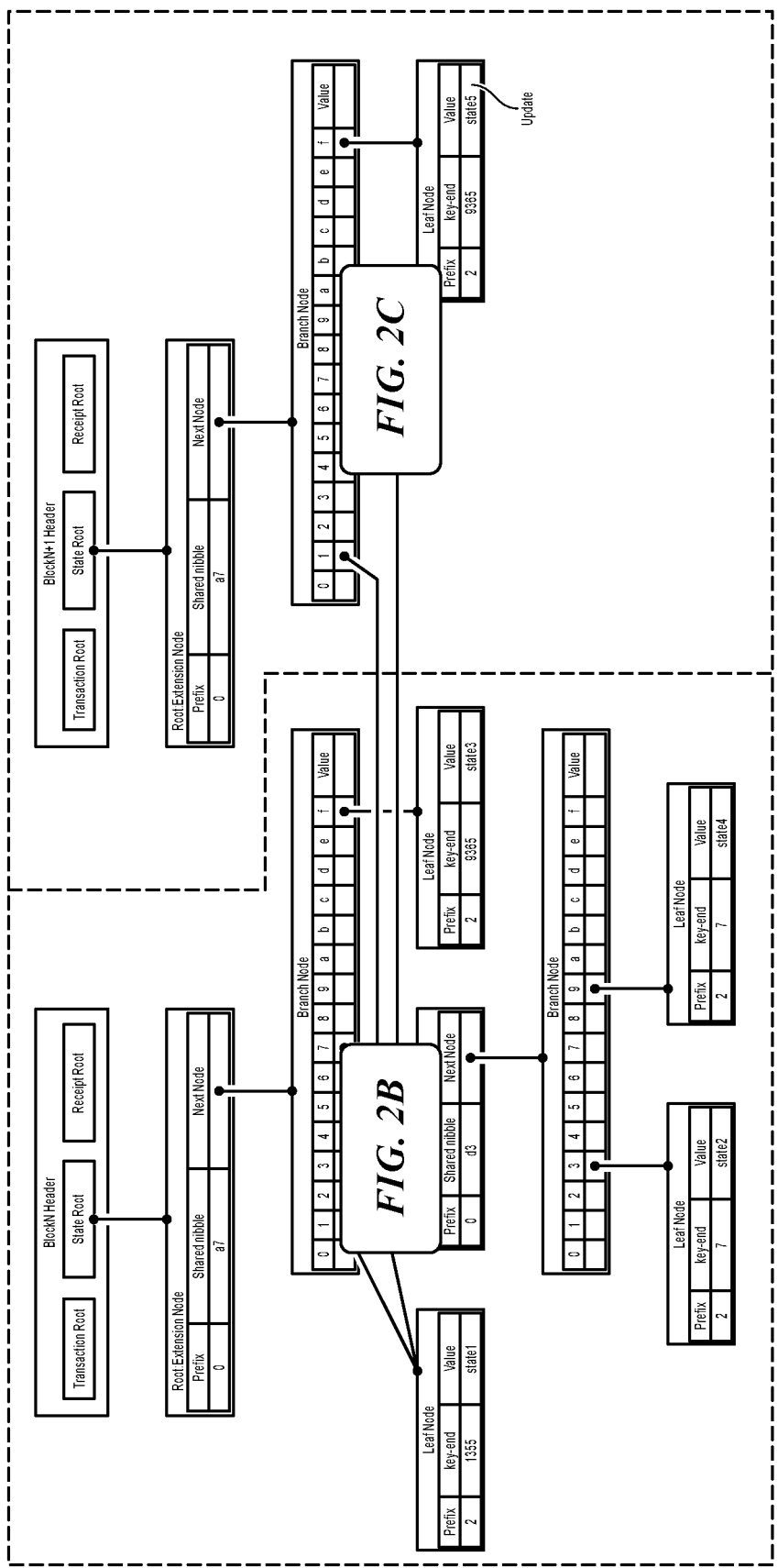
FIGS. 2A-2C represent a schematic diagram of reusing nodes on an MPT state tree, according to an example embodiment.
Figure 2B:
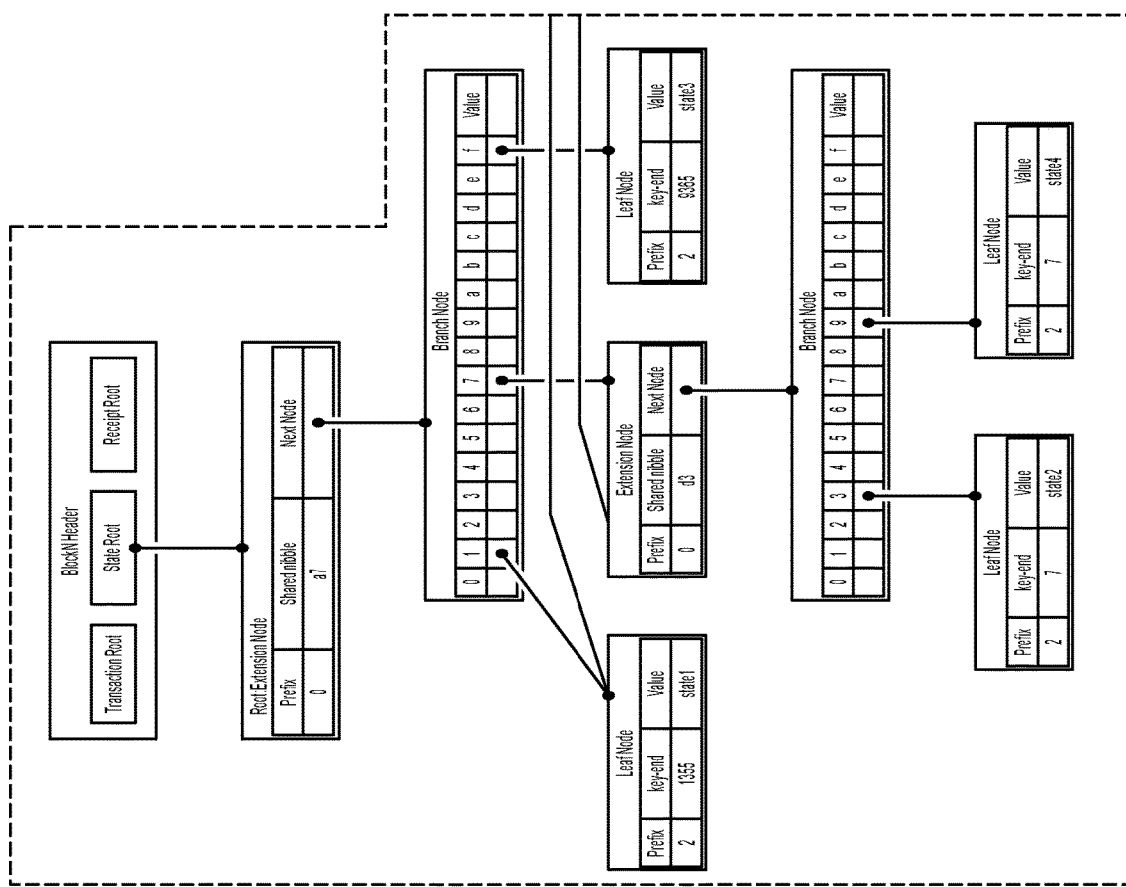
Figure 2C:
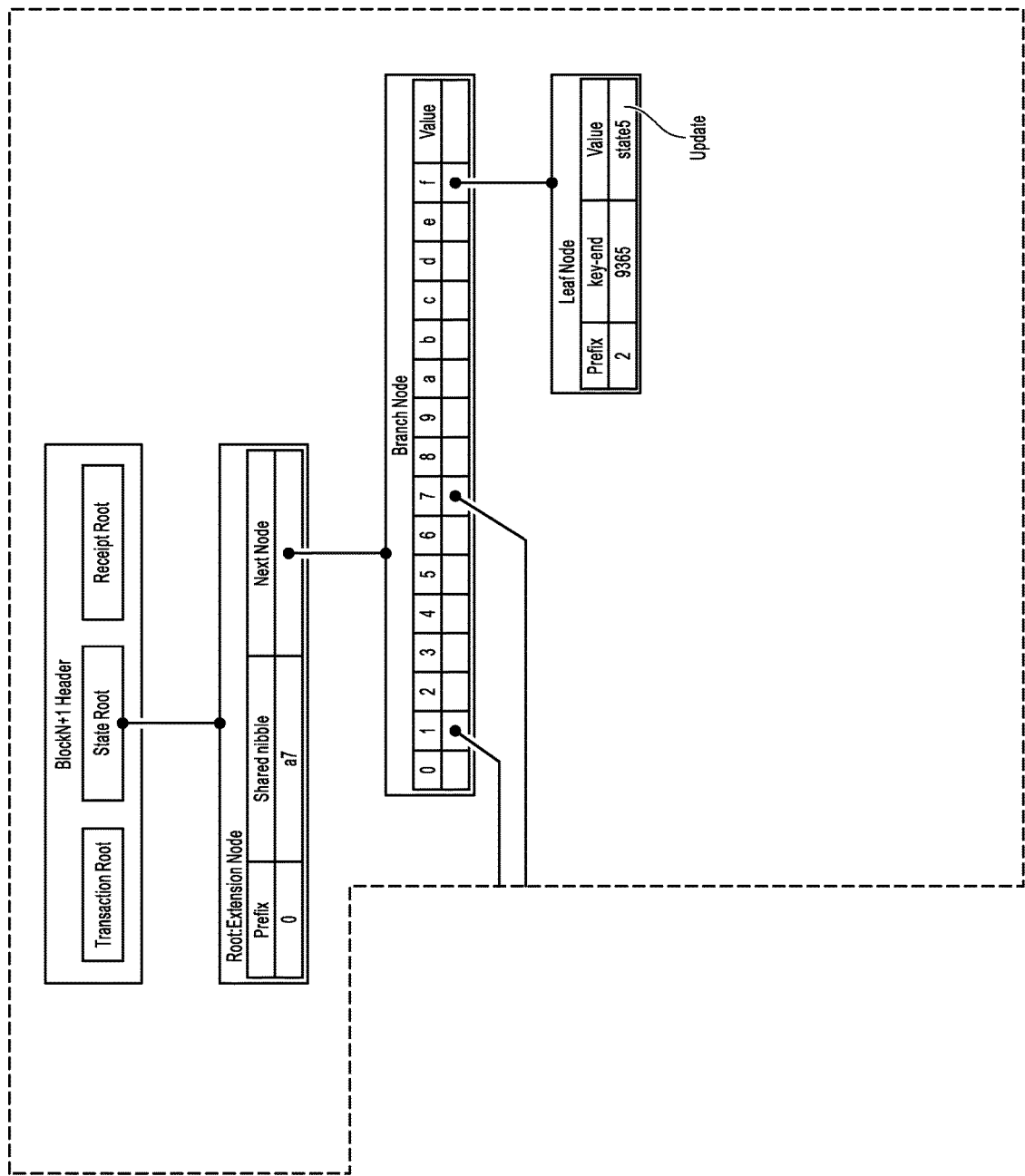

As shown in FIGS. 2A-2C, FIGS. 2A-2C represent a schematic diagram of reusing nodes on an MPT state tree shown in the present specification.

In actual application, whenever a latest block is generated by the blockchain, after the transactions in the latest block are executed, the account states of the accounts associated with these executed transactions in the blockchain usually changes with it.

For example, after a "transfer transaction" in the block is completed, the balance of the transfer account and the transferee account related to the "transfer transaction" (that is, the value of the Balance field of these accounts) usually change with it.

After the transactions in the latest block generated by the blockchain are executed, since the account states in the current blockchain have changed, the node device needs to build an MPT tree to maintain the latest states of all accounts in the blockchain based on the current account state data of all accounts in the blockchain.

That is, whenever a latest block is generated in the blockchain and the transactions in the latest block are completed, which causes the account states in the blockchain to change, the node device needs to rebuild an MPT tree based on the latest account state data of all accounts in the blockchain.

In other words, each block in the blockchain has a corresponding MPT state tree; the MPT state tree maintains the latest account states of all the accounts in the blockchain after the transactions in the block are completed.

It should be noted that, after execution of the transaction in the latest block generated by the blockchain is completed, it may only cause the account states of some accounts to change. Therefore, when updating the MPT state tree, it is not necessary to rebuild a complete MPT state tree based on the current state data of all accounts in the blockchain, but only need to update the nodes corresponding to the some accounts of which account states have changed based on the MPT state tree corresponding to the blocks before the latest block. For the nodes on the MPT state tree that correspond to the accounts of which account states have not changed, since no data updates have occurred on these nodes, the nodes on the MPT state tree corresponding to the blocks before the latest block can be readily reused.

As shown in FIGS. 2A-2C, it is assumed that the account state data in Table 1 is the latest account states of all accounts on the blockchain after execution of the transaction in Block N is completed, and the MPT state tree organized based on the account state data in Table 1 is still as shown in FIG. 1.

Assuming that after execution of the transaction in Block N+1 is completed, the account state of the account address "a7f9365" in Table 1 is updated from "state3" to "state5". At this time, when the Block N+1 updates the MPT state tree, it is not necessary to rebuild an MPT state tree based on the current state data of all accounts in the blockchain after execution of the transactions in Block N+1 is completed.

Referring to FIGS. 2A-2C, in this case, the value in the leaf node with the key-end being "9365" on the MPT tree corresponding to Block N (that is, the MPT state tree shown in FIG. 1) can be updated from "state3" to "state5", and continue to update the hash indexes of all nodes on the path from the root node to the leaf node. That is, when a leaf node on the MPT state tree is updated, as the hash value of the entire leaf node is updated, the hash indexes of all nodes on the path from the root node to the leaf node are also updated accordingly. For example, still referring to FIGS. 2A-2C, in addition to updating the value of Value field in a leaf node with a "key-end" of "9365", it also needs to update the hash index pointing to the leaf node which is filled in the f field of the previous branch node of the leaf node. Further, it is possible to continue to trace back to the root node, and continue to update the hash index pointing to the branch node which is filled in the "Next Node" field in the previous root node (Root Extension Node) of the branch node.

In addition to the nodes that have been updated above, other nodes that have not been updated can directly reuse the corresponding nodes on the MPT state tree of Block N.

Here, the MPT tree corresponding to Block N needs to be retained as historical data. Therefore, when the MPT state tree is updated by Block N+1, these updated nodes are not modified and updated directly on the original nodes on the MPT state tree corresponding to Block N, but these updated nodes are recreated on the MPT tree corresponding to Block N+1.

That is, on the MPT state tree corresponding to Block N+1, only a small number of nodes that need to be updated are actually recreated. For other nodes that have not been updated, the corresponding nodes on the MPT state tree corresponding to Block N can be directly reused.

For example, as shown in FIGS. 2A-2C, for the MPT state tree corresponding to Block N+1, actually only a few nodes that have been updated need to be recreated. For example, in FIGS. 2A-2C, only an expansion node as a root node, a branch node, and a leaf node need to be recreated; for the nodes that have not been updated; adding hash indexes pointing to the corresponding nodes on the MPT state tree corresponding to Block N to these recreated nodes on the MPT state tree to complete the "reusing" of the nodes. The nodes before the update on the MPT state tree corresponding to Block N will be saved as historical account state data. For example, the leaf node with "key-end" of "9365" and Value of "state3" shown in FIGS. 2A-2C will be retained as historical data. In the above example, content of a few nodes on the MPT state tree of Block N+1 are updated, most nodes of the previous block Block N can be "reused". In actual application, the MPT state tree of Block N+1 can also be added with a node compared to that of the previous block Block N.

In this case, although the newly added node cannot be "reused" directly from the MPT tree of the previous block Block N, it can be "reused" from the MPT state tree of an earlier block.

For example, although the newly added node on the MPT state tree of Block N+1 is not on the MPT state tree of Block N, the node may appear on the MPT state tree of an earlier block; for example, on the MPT state tree of Block N−1. Therefore, the newly added node on the MPT state tree of Block N+1 can directly reuse the corresponding node on the MPT state tree of Block N−1.

It can be seen that there are two types of "reusing" implementations for reusing nodes in an MPT state tree.

In one implementation, if only a small number of nodes on the MPT state tree of a block have updated content, they can "reuse" most of the nodes of the previous block.

In another implementation, if the MPT state tree of a block has newly added nodes compared to the MPT state tree of the previous block, the corresponding nodes on the MPT state tree of the earlier block can be "reused".

Through node reuse, the storage space of the database can be saved. However, due to the complex reusing relationship between the nodes on the MPT state trees of the blocks, for example, the nodes on the MPT state tree of each block can be reused by the next block, or by several consecutive blocks after the next block, such complex node reusing relationship will inevitably cause difficulties in hierarchical storage of the MPT state tree.

For example, some nodes need to be used as historical data and migrated from the current level of data storage to the lower level data storage, these nodes can be reused by the next block, or even by several blocks after the next block; and it is impossible to accurately predict which nodes will reuse these nodes. Therefore, it will be impossible to accurately prune the nodes on the MPT state tree stored in the database. Here, the pruning refers to clearing the reusing relationship between the nodes on the MPT state trees of the blocks, removing the nodes that have recorded historical state data from the MPT state tree, and keeping the nodes that have recorded the latest state data. In this case, the demand for hierarchical storage cannot be met.

Based on this, the present specification provides a hierarchical storage method for a state Merkle tree formed of account state data of a blockchain.

In implementation, the account state data of the blockchain can still be organized into a state Merkle tree and stored in a database with a multi-level data storage structure. For example, the data structure of the MPT tree can still be used to organize blockchain account state data into an MPT state tree. Assuming that the database with a multi-level storage structure is divided into n-level of data storage; the data storage of each level can be denoted as L0, L1, L2, L3, ... L (n−1) sequentially; here, the lower the level number is, the higher the corresponding level is; the MPT state trees of several latest blocks can be stored in L0 (that is, the highest-level data storage), the next latest block data is stored in L1, and so on.

When target data storage of any level in the database satisfies a data migration condition; for example, when the storage capacity of the target data storage reaches a threshold; at this time, data storage of the current level can enter a double-working-data-table stage and can, based on the working data table of the target data storage, create an empty data table corresponding to the working data table.

Further, when the target data storage enters the double-working-data-table stage, the state Merkle tree of a newly added block to be subsequently written into the target data storage can be stored in the empty data table, and the state Merkle tree of a block corresponding to the target block number stored in the working data table can be migrated into the empty data table. Here, the target block number is the largest block number among the block numbers corresponding to the state Merkle trees stored in the target data storage.

For example, when the target data storage satisfies the data migration condition, the largest block number among the block numbers corresponding to the state Merkle trees stored in the target data storage can be immediately recorded, and then after the target data storage enters the double-working-data-table stage, the nodes on the state Merkle tree of the block corresponding to the largest block number stored in the working data table can be traversed, and the traversed nodes are sequentially migrated to the empty data table.

After the state Merkle tree of the block corresponding to the target block number stored in the working data table is migrated to the empty data table, the state Merkle trees stored in the working data table (that is, the state Merkle trees corresponding to the remaining blocks after migration) are further migrated to the lower level data storage of the target data storage.

In the above technical solution, since the largest block number among the block numbers corresponding to the state Merkle trees stored in the working data table of the target data storage usually indicates the block number of the latest block stored in the working data table, the state Merkle tree of a newly added block written into the target data storage can be stored in the empty data table which is created for the target data storage and corresponding to the working data table, and the state Merkle tree corresponding to the largest block number stored in the working data table is also migrated into the empty data table. It can achieve storing the state Merkle tree of the latest block stored in the target data storage to the empty data table, and retaining the state Merkle trees of historical blocks in the working data table. In this way, after the state Merkle tree corresponding to the largest block number stored in the working data table has been migrated into the empty data table, by further migrating the state Merkle trees stored in the working data table to the lower level data storage of the target data storage, it can achieve hierarchical storage of the state Merkle trees of the target data storage, keeping storing and retaining the state Merkle tree of the latest block in the current-level storage, and migrating the state Merkle trees of historical blocks to the lower level data storage.

Figure 3:
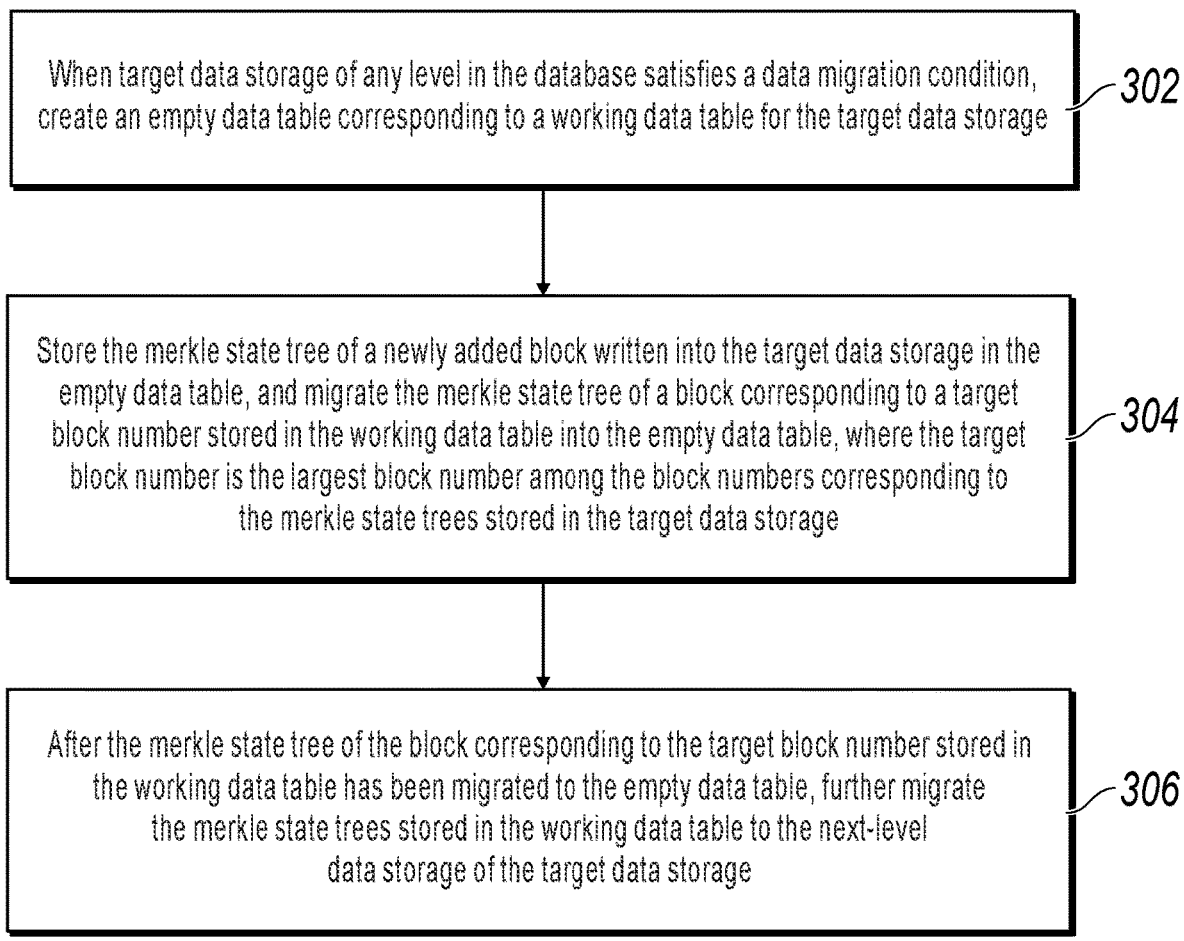
FIG. 3 is a flowchart of a hierarchical storage method based on a blockchain, according to an example embodiment.

Referring to FIG. 3, which is a flowchart of a hierarchical storage method based on a blockchain according to an example embodiment. The method is applied to a blockchain node device; wherein the account state data of the blockchain is organized into a state Merkle tree and stored in a database; the database includes multi-level data storage; and the method includes the following steps.

Step 302: when target data storage of any level in the database satisfies a data migration condition, an empty data table corresponding to a working data table is created for the target data storage.

Step 304: the state Merkle tree of a newly added block written into the target data storage can be stored in the empty data table, and the state Merkle tree of a block corresponding to a target block number stored in the working data table is migrated into the empty data table, where the target block number is the largest block number among the block numbers corresponding to the state Merkle trees stored in the target data storage.

Step 306: after the state Merkle tree of the block corresponding to the target block number stored in the working data table has been migrated to the empty data table, the state Merkle tree stored in the working data table is further migrated to the lower level data storage of the target data storage.

The database can be a Key-Value type database that has a multi-level data storage structure for storage. For example, in one illustrated implementation, the database can be a LevelDB database; or a database based on a LevelDB architecture. For example, a Rocksdb database is a typical database based on the LevelDB database architecture. The account state data in the blockchain can be organized into the data structure of the state Merkle tree and stored in the database. For example, the state Merkle tree can be an MPT tree, and a data structure of an MPT tree can be used to organize the account state data of the blockchain into an MPT state tree.

The following uses the data structure of the MPT tree to organize the account state data in the blockchain into an MPT state tree as an example to describe the technical solution of the present specification in detail.

It should be emphasized that using the data structure of the MPT tree to organize account state data in the blockchain is only exemplary.

In actual application, for blockchain projects based on the Ethereum architecture, in addition to the improved Merkle tree such as the MPT tree, it is also possible to use other forms of Merkle tree variants similar to the MPT tree that incorporates the tree structure of the Trie dictionary tree, which will not be listed one by one in the present specification.

In the present specification, a user client accessing the blockchain can package data into a standard transaction format supported by the blockchain, and then post it to the blockchain. The node devices in the blockchain can cooperate with other node devices to perform consensus on these transactions posted by the user client to the blockchain based on the installed consensus algorithm, to generate the latest blocks for the blockchain.

The consensus algorithms supported in the blockchain are generally divided into two types of consensus algorithms.

The first type is the consensus algorithms in which node devices have to compete for the book-keeping right of each round of book-keeping cycle, and the second type is the consensus algorithms in which book-keeping nodes are elected previously for each round of book-keeping cycle (no need to compete for the book-keeping right).

For example, the first type is represented by consensus algorithms such as Proof of Work (POW), Proof of Stake (POS), and Delegated Proof of Stake (DPOS); and the second type is represented by Practical Byzantine Fault Tolerance (PBFT) and other consensus algorithms.

For a blockchain network applying consensus algorithms such as Proof of Work (POW), Proof of Stake (POS), and Delegated Proof of Stake (DPOS) and other consensus algorithms, node devices that compete for the book-keeping right can execute a transaction upon receiving the transaction. One of the node devices competing for the book-keeping right can win in the current round of contention for the book-keeping right and become the book-keeping node. The book-keeping node can package the received transaction with other transactions to generate the latest block, and send the generated latest block to other node devices for consensus.

In the blockchain network applying the consensus algorithm such as Practical Byzantine Fault Tolerance (PBFT), the node device having the book-keeping right has been agreed on before the current round of book-keeping. Therefore, upon receiving a transaction, a node device, if the node device is not the book-keeping node of the current round, can send the transaction to the book-keeping node. The book-keeping node of the current round can execute the transaction during or before the transaction is packaged with other transactions to generate the latest block. After the book-keeping node packages the transaction and other transactions to generate the latest block, the book-keeping node can send the generated latest block or the block header of the latest block to other node devices for consensus.

As mentioned above, no matter which consensus algorithm is adopted by the blockchain, the book-keeping node of the current round can package the received transaction to generate the latest block, and the generated latest block or the block header of the latest block is sent to other node devices for consensus verification. If other node devices receive the latest block or the block header of the latest block, and it is verified that there is no problem, the latest block can be added to the end of the original blockchain to complete the book-keeping process of the blockchain.

In the present specification, after the node devices in the blockchain perform the transactions packaged in the latest block generated by consensus, the account state related to these executed transactions in the blockchain will usually change accordingly. Therefore, after the node devices perform the packaged transactions in the latest block, the node devices can organize a data structure of an MPT state tree based on the latest account state data of all accounts in the blockchain.

Here, when organizing an MPT state tree based on the latest account state data of all accounts in the blockchain, the method of reusing nodes on the MPT tree corresponding to the block before the latest block as shown in FIGS. 2A-2C can still be used, which is not repeated in the present specification.

When the node device organizes the MPT state tree based on the latest account state data of all accounts in the blockchain, the node device can store the data nodes on the MPT state tree in the form of key-value pairs Key-Value in a Key-Value database with a multi-level data storage structure.

For example, in actual application, the data nodes on the MPT state trees corresponding to some latest blocks can be stored by default in the highest level L0 data storage in the database. The data nodes on the MPT state trees corresponding to some second latest blocks may be stored in the second highest level L1 data storage in the database; and so on.

Here, the number of blocks corresponding to the MPT state tree stored in each level of data storage is not specifically limited in the present specification; for example, the highest level L0 of data storage can be specified to store the MPT state trees of N latest blocks, and the second highest level L1 of data storage can be specified to store the MPT state tree of the N second latest blocks; and so on.

In the present specification, the node device can also start a "migration thread" locally for migrating the node data on the MPT state tree stored in the data storage at each level in the database to the lower level of data storage.

The "migration thread" can execute a scheduled task, and can periodically determine whether the data storage of each level in the database satisfies a preset data migration condition.

The data migration condition of the data storage of each level in the database can be set based on actual data migration requirement, which is not particularly limited in the present specification.

For example, in actual application, the data migration condition of the data storage at each level of the database can be that a storage capacity of the data storage at each level reaches a threshold; or it can also be that a number of blocks corresponding to the data stored in the data storage at each level reaches a threshold.

When the "migration thread" determines that the target data storage at any level in the database satisfies the data migration condition, the "migration thread" can perform data migration processing on the target data storage, and migrate part of the MPT state trees of the blocks stored in the target data storage to the lower level data storage as historical data.

In actual application, each level of data storage in the database can include a working data table; for any level of data storage in the database, all the MPT state trees stored in the current level of data storage will be written to the working data table by default; correspondingly, when a node on the MPT state tree stored in the data storage of the current level is searched for, data can be read from the working data table.

When the "migration thread" determines that the target data storage satisfies the data migration condition, the target data storage can enter a double-working-data-table stage, the "migration thread" can, based on the working data table of the target data storage, create an empty data table corresponding to the working data table for the target data storage (that is, the empty data table is also a working data table).

The specific process of creating an empty data table for the target data storage based on the working data table of the target data storage by the "migration thread" will not be described in detail in the present specification.

For example, in implementation, a new database instance can be created on the basis of the database instance (a database can have multiple database instances) corresponding to the working data table of the target data storage, and the new database instance is associated with the created empty data table, so that programs accessing the database can access through the database instance the data that has been written to the empty data table.

The database instance usually refers to a layer of data management program located between the user and the operating system. Any operation by the user on the data in the database, including data definition, data query, data maintenance, database operation control, and the like, is performed under the database instance, and the application can access the data stored in the database only through the database instance.

It should be noted that the working data table of the data storage of each level in the above database can include only one data table or multiple data tables. Accordingly, the empty data table which is created for the target data and corresponding to the working data table storage by the "migration thread" can include only one data table or multiple data tables. That is, the working data table and the empty data table described in the present specification can both be understood as an independent database composed of one data table or multiple data tables.

Moreover, in actual application, since the actual storage capacity of the data storage at each level in the above database can be different, the number of data tables actually contained in the working data tables of the data storage at each level in the above database can also be different.

For example, taking the database being a LevelDB database as an example, the LevelDB database contains multiple levels of data storage, and each level of data storage can contain several SStables (Sorted String Tables). The SStable is also referred to as an SST file, and acts as a data table for storing the data written to the data storage of each level.

Here, for the data storage of each level of the LevelDB database, the actual storage capacity usually also has a certain difference. In actual application, the higher the level number of the data storage is, the higher the read-write performance the employed storage medium usually has; and correspondingly, although the read-write performance of the storage medium used for low-level data storage is lower than that of high-level data storage, the storage capacity of the storage medium used is usually higher than that of high-level data storage.

Therefore, the higher the level number of the data storage is, the smaller the number of SStable data tables it contains. In contrary, the lower the level number of the data storage is, the larger the number of SStable data tables it contains, since the read-write performance of the storage medium it uses is lower than that of high-level data storage, which usually has a larger storage capacity.

In the present specification, when the target data storage enters the double-working-data-table stage, after the "migration thread" creates an empty data table corresponding to the working data table of the current level data storage for the target data storage, data nodes on the MPT state tree of the newly added block written into the target data storage are no longer written into the working data table of the target data storage, but written into the created empty data table for the target data storage.

The MPT state tree of the newly added block that needs to be written into the target data storage usually includes the following two situations.

In one situation, if the target data storage is the highest-level data storage in the above database, since the highest-level data storage is usually used to write the MPT state tree of the latest block generated by the blockchain, the MPT state tree of the newly added block that needs to be written to the target data storage refers to the MPT state tree of the latest block generated by the blockchain.

In the other situation, if the target data storage is not the highest-level data storage in the database, the MPT state tree of the newly added block that needs to be written to the target data storage refers to the state Merkle tree of a historical block that migrates from the higher-level data storage of the target data storage to the target data storage.

In the present specification, in addition to making it no longer necessary to write the MPT state tree of the newly added block to be written to the target data storage into the working data table of the target data storage, the "migration thread" can also migrate the MPT state tree of the block corresponding to the target block number stored in the working data table of the target data storage to the empty data table as the latest state data. In the present specification, the target block number is the largest block number among the block numbers corresponding to the MPT state trees currently stored in the target data storage.

For example, in implementation, when the target data storage satisfies the data migration condition, the migration thread can immediately record the largest block number among the block numbers corresponding to all state Merkle trees stored in the target data storage, and then after the target data storage enters the double-working-data-table stage, the migration thread can traverse the nodes on the state Merkle tree of the block corresponding to the largest block number stored in the working data table, and migrate the traversed nodes to the empty data table sequentially. For example, in implementation, the "migration thread" can traverse and copy the nodes on the state Merkle tree of the block corresponding to the largest block number, and write the copied nodes to the empty data table, and then after the copied nodes are successfully written into the empty data table, the nodes are then cleared from the working data table.

It should be noted that, since subsequently, the MPT state tree of the newly added block that needs to be written to the target data storage will be directly written into the empty data table, in actual application, part of the nodes on the MPT state tree of the block corresponding to the largest block number can be directly written into the empty data table.

For example, when the target data storage satisfies the data migration condition, if all the nodes on the MPT state tree of the block corresponding to the largest block number have not all been written into the working data table, subsequently, the part of the nodes on the MPT state tree which have not been written into the working data table can be directly written into the empty data table.

In this case, the process of "migration thread" migrating the nodes on the MPT state tree of the block corresponding to the largest block number stored in the working data table of the target data storage to an empty data table is actually an "incremental completion" process for the nodes on the MPT state tree stored in the empty data table.

That is, after the target data storage enters the double-working-data-table stage, the "migration thread" will complete the nodes on the MPT state tree newly written in the empty data table with the part of nodes on the MPT state tree of the block corresponding to the largest block number stored in the working data table.

Further, after the migration thread migrates the MPT state tree of the block corresponding to the largest block number stored in the working data table to the empty data table, the MPT state tree of the "latest block" stored in the working data table has been migrated to the newly created empty data table. At this time, the migration thread can further migrate the MPT state trees stored in the working data table to the lower level storage of the target data storage, to complete the target hierarchical storage of the MPT state trees stored in the target data storage.

In an illustrated implementation, after the migration thread migrates the MPT state tree of the block corresponding to the largest block number stored in the working data table to the empty data table, the work thread can switch the working data table to a historical data table, and switch the empty data table to a working data table. At this time, the target data storage re-enters the single-working-data-table stage.

Correspondingly, the migration thread can also, after switching the working data table to the historical data table, execute the action of migrating the MPT state tree of the block corresponding to the largest block number stored in the historical data table to the lower level data storage of the target data storage.

That is, the migration thread can, after the target data storage is re-entered into the single-working-data-table stage, start to migrate the MPT state tree of the block corresponding to the largest block number stored in the working data table before switching to the lower level data storage for the target data storage.

For example, in implementation, after the above working data table is switched to a historical data table, the "migration thread" can traverse and copy the nodes on the MPT state tree corresponding to each block stored in the historical data table, and write the copied nodes to the lower level data storage, and then clear the nodes from the historical data table.

After the migration thread migrates all the MPT state trees stored in the historical data table to the lower level data storage, the historical data table can be deleted from the target data storage.

In the present specification, depending on the target data storage is in the single-working-data-table stage or the double-working-data-table stage, there will also be some differences in the reading process for the nodes on the MPT state tree stored in the target data storage.

If the target data storage is currently in a single-working-data-table stage, that is, the target data storage only has a unique working data table, usually only reads and writes data from the unique working data table. If the target data storage is currently in the double-working-data-table stage, that is, when the target data storage has both a default working data table and a newly created empty data table, the target data storage can simultaneously read data from the default working data table and the newly created empty data, or can only read data from the newly created empty data table.

In an illustrated implementation, when the target data storage has double working data tables, the migration thread can also choose to store the MPT state tree of the newly added block to be written in the target data storage only to the empty data table. In this case, upon receiving a searching request for a node on the MPT state tree of the target data storage while the target data storage has double working data tables, the node device may, in response to the searching request, search for the node from both of the empty data table and the working data table.

In another illustrated implementation, while the target data storage has double working data tables, the migration thread can also choose to store the MPT state tree of the newly added block to be written in the target data storage to both of the empty data table and the working data table. In this case, upon receiving a searching request for a node on the MPT state tree of the target data storage while the target data storage has double working data tables, the node device can, in response to the searching request, search for the node only from the working data table.

That is, in the present specification, when the target data storage satisfies the data migration condition and entered the dual-working data table stage, the nodes on the MPT state tree of the newly added block of the target data storage can be written only to the created empty data table, or can be written into both of the empty data table and the working data table, which is not particularly limited in the present specification.

In the above technical solution, since the largest block number among the block numbers corresponding to the MPT state trees stored in the working data table of the target data storage usually indicates the block number of the latest block stored in the working data table, the MPT state tree of the newly added block to be written in the target data storage is stored into an empty data table which is created for the target data storage and corresponding to the working data table, and the MPT state tree corresponding to the largest block number stored in the working data table is also migrated to the empty data table. It can achieve storing the MPT state tree of the latest block stored in the target data storage to the empty data table, and retaining the MPT state trees of historical blocks in the working data table. In this way, after the MPT state tree corresponding to the largest block number stored in the working data table has been migrated into the empty data table, by further migrating the MPT state trees stored in the working data table to the lower level data storage of the target data storage, it can achieve hierarchical storage of the MPT state trees of the target data storage, keeping storing and retaining the MPT state tree of the latest block in the current-level storage, and migrating the MPT state trees of historical blocks to the lower level data storage. Corresponding to the above method embodiment, the present application also provides an embodiment of an apparatus. Corresponding to the above method embodiment, the present specification also provides an embodiment of a hierarchical storage apparatus based on a blockchain.

The embodiment of the hierarchical storage apparatus based on a blockchain of the present specification can be applied to an electronic device. The apparatus embodiment can be implemented by software, or by hardware or a combination of software and hardware. Taking software implementation as an example, as an apparatus in a logical sense, it is formed by reading the corresponding computer program instructions in a non-volatile memory into a memory through a processor of an electronic device where it is located.

Figure 4:
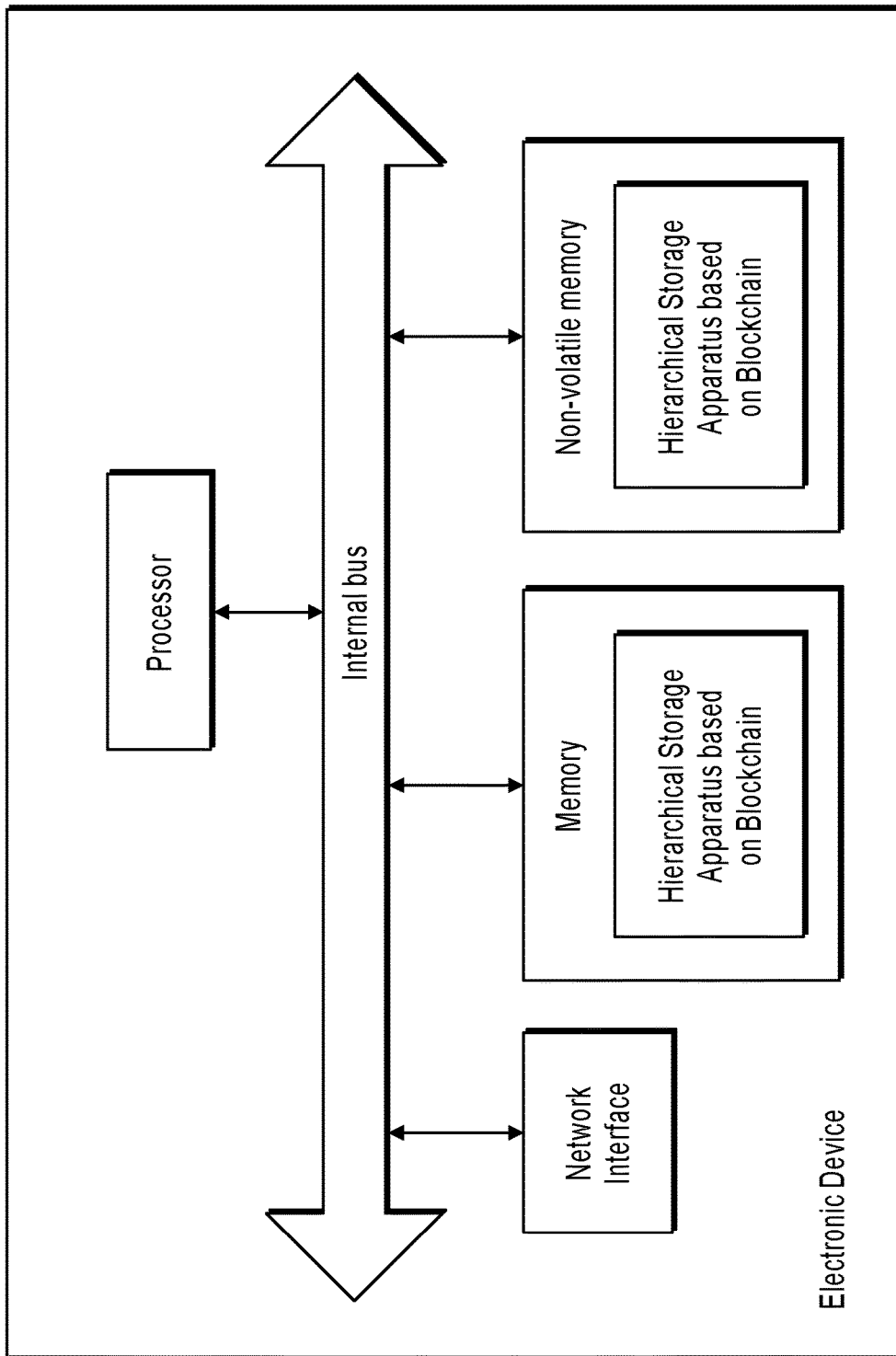
FIG. 4 is a schematic structural diagram of an electronic device, according to an example embodiment.

In terms of hardware, as shown in FIG. 4, which is a hardware structure diagram of an electronic device where the hierarchical storage apparatus based on a blockchain of the present specification is located, in addition to the processor, the memory, the network interface, and the non-volatile memory, the electronic device in which the apparatus is located in the embodiment can generally include other hardware based on the actual function of the electronic device, details of which will not be elaborated herein.

Figure 5:
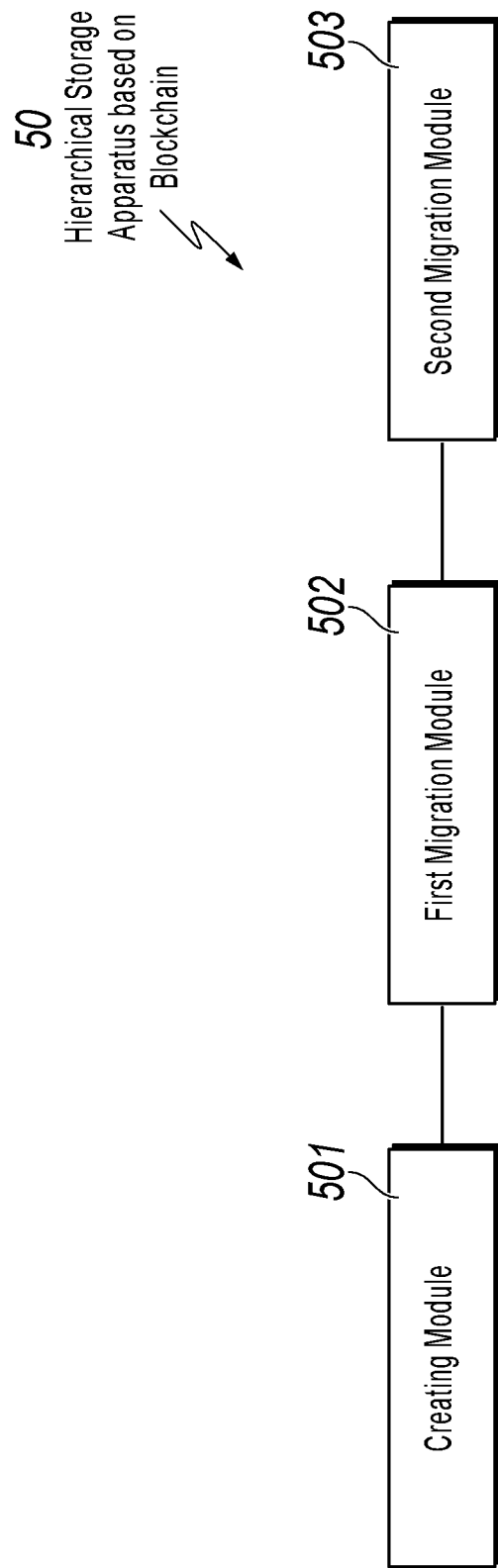
FIG. 5 is a block diagram of a hierarchical storage apparatus based on a blockchain, according to an example embodiment.

FIG. 5 is a block diagram of a hierarchical storage apparatus based on a blockchain according to an example embodiment of the present specification.

Referring to FIG. 5, the hierarchical storage apparatus 50 based on a blockchain can be applied to an electronic device as shown in FIG. 4; account state data of the blockchain is organized into a state Merkle tree and stored in a database; the database includes multi-level data storage; and the apparatus 50 includes: a creating module 501, configured to when target data storage of any level in the database satisfies a data migration condition, create an empty data table corresponding to a working data table for the target data storage; a first migration module 502, configured to store the state Merkle tree of a newly added block written into the target data storage in the empty data table, and migrate the state Merkle tree of a block corresponding to a target block number stored in the working data table into the empty data table, where the target block number is the largest block number among the block numbers corresponding to the state Merkle trees stored in the target data storage; and a second migration module 503 configured to, after the state Merkle tree of the block corresponding to the target block number stored in the working data table has been migrated to the empty data table, further migrate the state Merkle trees stored in the working data table to the lower level data storage of the target data storage.

In the embodiment, the first migration module 502 is configured to after the state Merkle tree of the block corresponding to the target block number stored in the working data table has been migrated to the empty data table, switch the working data table to a historical data table, and switch the empty data table to a working data table.

In the embodiment, the second migration module 503 is further configured to after the working data table is switched to a historical data table, further migrate the state Merkle trees stored in the historical data table to a lower level data storage of the target data storage; and after the state Merkle trees stored in the historical data table has been successfully migrated to the lower level data storage of the target data storage, delete the historical data table.

In the embodiment, the first migration module 502 is configured to store the state Merkle tree of the newly added block written into the target data storage only to the empty data table; or store the state Merkle tree of the newly added block written into the target data storage into both of the empty data table and the working data table.

In the embodiment, the apparatus can further include: a searching module 504 (not shown in FIG. 5), configured to upon receiving a searching request for a data node on a state Merkle tree of the target data storage while the target data storage has double working data tables, if the state Merkle tree of the newly added block written to the target data storage is only stored to the empty data table, in response to the searching request, search for the node from both of the empty data table and the working data table; and if the state Merkle tree of the newly added block written to the target data storage is stored to both of the empty data table and the working data table, in response to the searching request, search for the node only from the working data table.

In the embodiment, the state Merkle tree of the newly added block includes: the state Merkle tree of the latest block generated by the blockchain; or the state Merkle tree of the historical block which is migrated from the upper-level data storage to the target data storage.

In the embodiment, the database is a Key-Value database; and the data nodes on the state Merkle tree are stored in the database in the form of Key-Value pairs; wherein the key of the Key-Value pair is a hash value of the data content contained in the data node; the value of the Key-Value pair is the data content contained in the data node.

In the embodiment, the Merkle tree is a variant of the Merkle tree incorporating a Trie dictionary tree structure.

In the embodiment, the state Merkle tree is a Merkle Patricia Tree state tree.

In the embodiment, the database is a LevelDB database; or a database based on the LevelDB architecture.

In the embodiment, the database is a Rocksdb database based on the LevelDB architecture.

In the embodiment, the read-write performance of the storage medium corresponding to the multi-level data storage has a difference in performance; and the read-write performance of the storage medium corresponding to the high-level data storage is higher than the read-write performance of the storage medium corresponding the low-level data storage.

The system, apparatus, module, or unit described in the previous embodiments can be implemented by a computer chip or entity, or a product with a certain function. A typical implementation device is a computer, and the specific form of the computer can be a personal computer, a laptop computer, a cellular phone, a camera phone, a smart phone, a personal digital assistant, a media player, a navigation device, an email sending and receiving device, and a game console, a tablet computer, a wearable device, or a combination of any of these devices.

In a typical configuration, a computer includes one or more processors (CPUs), input/output interfaces, network interfaces, and memories.

The memory can include a transitory memory, a random access memory (RAM), and/or a non-volatile memory in a computer-readable medium, such as a read-only memory (ROM) or a flash RAM. The memory is an example of a computer-readable medium.

The computer-readable medium includes either permanent or non-permanent, either removable or non-removable medium, which can store information by any method or technology. Information can be computer-readable instructions, data structures, modules of a program, or other data. Examples of computer storage media include, but are not limited to, a phase change memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a read-only disc, a read-only memory (CD-ROM), a digital versatile disc (DVD) or other optical storage, a magnetic tape cartridge, magnetic disk storage, a quantum memory, graphene-based storage media, or other magnetic storage devices or any other non-transmission media can be used to store information that can be accessed by computing devices. As defined in this specification, computer-readable media does not include transitory computer-readable media (transitory media), such as modulated data signals and carrier waves.

It should also be noted that the terms "including", "comprising" or any other variation are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including a . . . " do not exclude the existence of other identical elements in the process, method, product or device including the elements.

The specific embodiments of the present specification have been described above. Other embodiments are within the scope of the following claims. In some cases, the actions or steps recited in the claims may be performed in a different order than in the embodiments and the desired result may still be achieved. In addition, the processes depicted in the figures do not necessarily require the particular order shown or sequential order to achieve the desired results. In some embodiments, multitasking and parallel processing are also possible or may be advantageous.

The terms used in the present specification are for the purpose of describing particular examples only, and are not intended to limit the present specification. Terms determined by "a", "the" and "said" in their singular forms in the present specification and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present specification to describe various information, such information should not be limited to these terms. These terms are only used to distinguish one category of information from another. For example, without departing from the scope of the present specification, first information can be referred as second information; and similarly, second information can also be referred as first information. Depending on the context, the word "if" as used here can be interpreted as "when" or "upon" or "in response to determining".

The above descriptions are merely preferred embodiments of one or more embodiments of the present specification, and are not intended to limit one or more embodiments of the present specification. Wherever within the spirit and principle of one or more embodiments of the present specification, any modification, equivalent replacement, improvement, etc. should be included in the protection scope of one or more embodiments of the present specification.

What is claimed:

1. A blockchain-based hierarchical storage method comprising:
   generating, for a target level of storage, an empty data worksheet in response to determining that the target level of storage meets a data migration condition;
   storing at least a portion of a first state Merkle tree corresponding to a newly created block of a blockchain to the empty data worksheet;
   migrating a second state Merkle tree corresponding to a target block stored in a data worksheet to the empty data worksheet, wherein the target block has a largest block number among block numbers of blocks corresponding to state Merkle trees stored in the target level of storage; and
   after migrating the second state Merkle tree corresponding to the target block, migrating the state Merkle trees stored in the data worksheet to a lower level of storage than the target level of storage, wherein the lower level of storage has lower storage cost.

2. The method according to claim 1, further comprising:
   after migrating the second state Merkle tree corresponding to the target block to the empty data worksheet, renaming the data worksheet as a historical data worksheet.

3. The method according to claim 2, further comprising:
   after renaming the data worksheet as the historical data worksheet and migrating the state Merkle trees stored in the historical data worksheet to the lower level of storage, deleting the historical data worksheet.

4. The method according to claim 1, wherein a remainder of the first state Merkle tree corresponding to the newly created block other than at least the portion of the first state Merkle tree is stored in the empty data worksheet if not all the first state Merkle tree is stored in the empty data worksheet.

5. The method according to claim 4, further comprising:
   receiving a search request for a data node of the first state Merkle tree after the empty data worksheet is generated;
   determining whether all the first state Merkle tree is stored in the empty data worksheet;
   searching the empty data worksheet in response to determining that all the first state Merkle tree is stored in the empty data worksheet; and
   searching the empty data worksheet and the data worksheet in response to determining that not all the first state Merkle tree is stored in the empty data worksheet.

6. The method according to claim 1, wherein the first state Merkle tree corresponding to the newly created block comprises a latest block appended to the blockchain and historical blocks migrated from higher level of storage that has higher storage cost.

7. The method according to claim 1, wherein the blockchain is stored in a database, the database is a key-value database, data nodes included in the state Merkle state tree are stored as key-value pairs (KVPs), keys of the KVPs are hash values of corresponding values of the KVPs, and the values of the KVPs are data content of the corresponding data nodes.

8. The method according to claim 1, wherein the first state Merkle tree or the second state Merkle tree has a tree structure constructed based on a Merkle tree and a prefix tree.

9. The method according to claim 8, wherein the first state Merkle tree or the second state Merkle tree is a Merkle Patricia tree (MPT).

10. The method according to claim 1, wherein the blockchain is stored in a database and the database is a LevelDB database.

11. The method according to claim 1, wherein the blockchain is stored in a database and the database is a RocksDB database.

12. The method according to claim 1, wherein the lower level of storage is associated with lower storage cost and lower read-write performance.

13. A computer-implemented system, comprising:
    one or more computers, and
    one or more computer memory devices interoperably coupled with the one or more computers and having tangible, non-transitory, machine-readable media storing one or more instructions that, when executed by the one or more computers, perform operations comprising:
    generating, for a target level of storage, an empty data worksheet in response to determining that the target level of storage meets a data migration condition;
    storing at least a portion of a first state Merkle tree corresponding to a newly created block of a blockchain to the empty data worksheet;
    migrating a second state Merkle tree corresponding to a target block stored in a data worksheet to the empty data worksheet, wherein the target block has a largest block number among block numbers of blocks corresponding to state Merkle trees stored in the target level of storage; and
    after migrating the second state Merkle tree corresponding to the target block, migrating the state Merkle trees stored in the data worksheet to a lower level of storage than the target level of storage, wherein the lower level of storage has lower storage cost.

14. The computer-implemented system according to claim 13, further comprising:

after migrating the second state Merkle tree corresponding to the target block to the empty data worksheet, renaming the data worksheet as a historical data worksheet.

15. The computer-implemented system according to claim 14, further comprising:
  after renaming the data worksheet as the historical data worksheet and migrating the state Merkle trees stored in the historical data worksheet to the lower level of storage, deleting the historical data worksheet.

16. The computer-implemented system according to claim 13, wherein a remainder of the first state Merkle tree corresponding to the newly created block other than at least the portion of the first state Merkle tree is stored in the empty data worksheet if not all the first state Merkle tree is stored in the empty data worksheet.

17. The computer-implemented system according to claim 16, further comprising:
  receiving a search request for a data node of the first state Merkle tree after the empty data worksheet is generated;
  determining whether all the first state Merkle tree is stored in the empty data worksheet;
  searching the empty data worksheet in response to determining that all the first state Merkle tree is stored in the empty data worksheet; and
  searching the empty data worksheet and the data worksheet in response to determining that not all the first state Merkle tree is stored in the empty data worksheet.

18. The computer-implemented system according to claim 13, wherein the first state Merkle tree corresponding to the newly created block comprises a latest block appended to the blockchain and historical blocks migrated from higher level of storage that has higher storage cost.

19. The computer-implemented system according to claim 13, wherein the blockchain is stored in a database, the database is a key-value database, data nodes included in the state Merkle state tree are stored as key-value pairs (KVPs), keys of the KVPs are hash values of corresponding values of the KVPs, and the values of the KVPs are data content of the corresponding data nodes.

20. A non-transitory, computer-readable medium storing one or more instructions executable by a computer system to perform operations comprising:
  generating, for a target level of storage, an empty data worksheet in response to determining that the target level of storage meets a data migration condition;
  storing at least a portion of a first state Merkle tree corresponding to a newly created block of a blockchain to the empty data worksheet;
  migrating a second state Merkle tree corresponding to a target block stored in a data worksheet to the empty data worksheet, wherein the target block has a largest block number among block numbers of blocks corresponding to state Merkle trees stored in the target level of storage; and
  after migrating the second state Merkle tree corresponding to the target block, migrating the state Merkle trees stored in the data worksheet to a lower level of storage than the target level of storage, wherein the lower level of storage has lower storage cost.

* * * * *